United States Patent Office 3,412,374
Patented Nov. 19, 1968

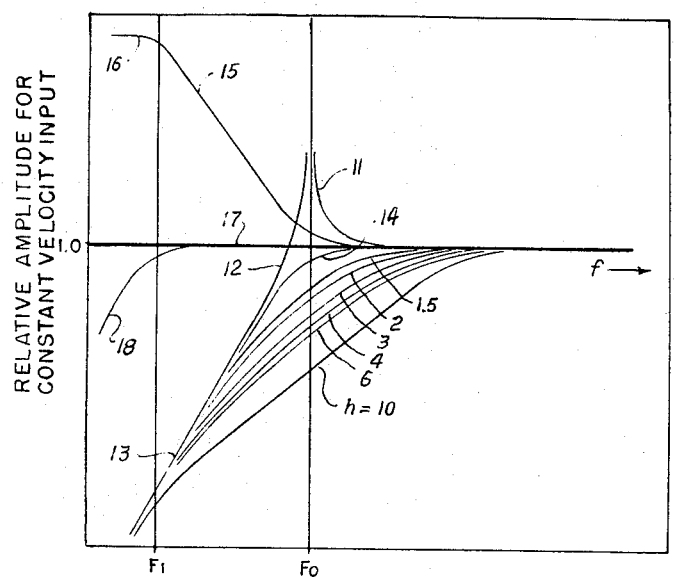
Fig. 1-a
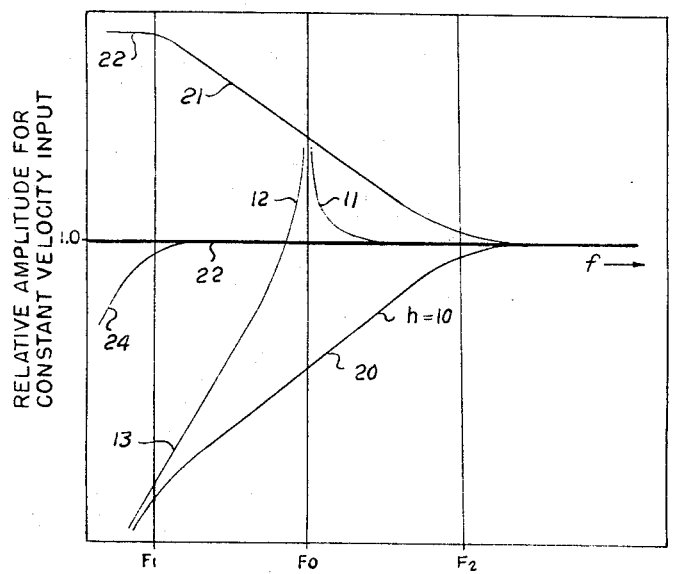
Fig. 1-b
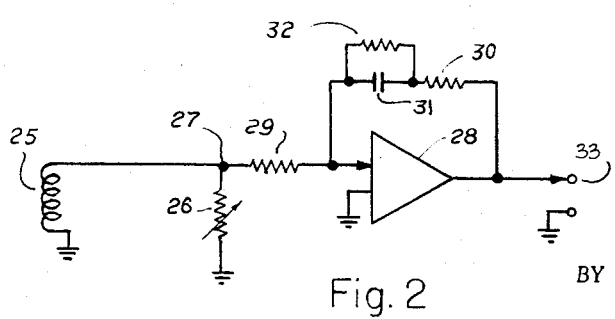
Fig. 2
INVENTOR
Walter R. Mitchell

3,412,374
SHORT PERIOD SEISMIC SYSTEM WITH
LONG PERIOD RESPONSE
Walter R. Mitchell, Dallas, Tex., assignor to Teledyne
Exploration Company, Houston, Tex., a corporation
of Texas
Filed June 26, 1967, Ser. No. 648,804
9 Claims. (Cl. 340—15.5)

ABSTRACT OF THE DISCLOSURE

This application discloses a seismic system using a highly damped seismometer in conjunction with an amplifier which provides single integration to produce a system response flat for low frequencies, above and below the natural frequency of the seismometer. This combination provides the capability of linear measurement of very large earth movements in a stable system.

---

It is the general purpose of the present invention to provide a portable seismic system which is capable of measuring low-frequency seismic signals, meaning below about 1 Hz., with the system being free of the inherent stability problems possessed by previous low-frequency seismometers. A particular feature of the system is the capability of withstanding large earth motions, in excess of perhaps 1 meter in amplitude, as may occur in instrumentation for underground nuclear tests.

A seismometer consists essentially of a magnet and a coil of wire constructed so that one of these components is spring suspended to permit motion relative to the other of the components. When such relative motion occurs between the magnet and the coil, a voltage is generated in the coil which is usually amplified and subsequently recorded. Ordinarily the seismometer is placed on the ground so that when the ground moves the seismometer generates a voltage due to the relative motion between the fixed component, including the permanent magnet and the case, and suspended component or mass usually consisting of the coil.

The frequency response of the seismometer, often plotted in terms of constant velocity earth motion versus frequency as seen in the figures as will be subsequently described, will exhibit a peak at the natural mechanical resonance of the seismometer device, and this peak is smoothed out by damping. Damping may be achieved by allowing the seismometer coil to supply current to an external load since the current flowing through the coil winding interacts with the magnetic field so as to generate a force which opposes the motion of the suspended mass. The more current that is permitted to flow, the greater is the damping factor. Also the seismometer may be damped by mechanical means as by a dash-pot containing fluid. In normal seismic work a damping factor of 0.707 is used to obtain a frequency response which is flat over a maximum range. For this value of damping, the roll-off rate of the seismometer velocity sensitivity is 12 db per octave for frequencies below the natural frequency of the suspended mass. The use of a seismometer with critical damping for the frequencies of interest here and for very large ground displacements introduce difficulties as will be noted below.

In measuring seismic disturbances with frequency content below about 1 Hz. usually a seismometer with a natural frequency equal to the lowest frequency of interest is required. The natural frequency of a suspended spring-mass system is $$F_o = \frac{\sqrt{K/M}}{2\pi}$$

where $F_o$ is the natural frequency, $K$ is the stiffness of the spring suspension system, and $M$ is the suspended mass. As $F_o$ becomes less than 1 Hz. the value of $K$ becomes very small, and the value of $M$ becomes very large. The large value of $M$ make the seismometer bulky and difficult to move from place to place, while the small values of the suspension stiffness, $K$, make the seismometer very sensitive to tilt. Changes in ambient temperature are often enough to introduce sufficient tilt to cause the mass to go completely to one of its stops.

The relation between the earth displacement, $X$, and the relative displacement between the mass and the case of the seismometer, $Y$, as a function of frequency, $F$, is given by Equation 1:

$$\frac{X}{Y} = \sqrt{4h^2\left(\frac{F_o}{F}\right)^2 + \left(1 - \frac{F_o^2}{F^2}\right)^2} \qquad (1)$$

The amplitude of earth displacement is measured relative to a reference point which is fixed with respect to the center of the earth. Calculation using Equation 1 shows that for a damping factor $h=0.707$, critical damping being $h=1$, $X$ is within 1% of $Y$ for values of $F$ greater than 2.65 $F_o$, meaning that the suspended mass remains essentially motionless in space while the case moves around it. The magnitude of earth motion which the seismometer is capable of measuring is therefore limited to substantially the stop-to-stop dimensional constraint of the seismometer for frequencies above $F_o$. This dimension is limited to a fraction of an inch in a practical seismometer, and so values of several feet $f$ or $Y$ are completely out of the question in the conventional seismometer.

The relation between the seismometer output voltage, $E$, and the earth velocity, $V$, as a function of frequency is given by Equation 2:

$$\frac{V}{E} = \frac{\sqrt{4h^2\left(\frac{F_o^2}{F}\right)^2 \left(\frac{F_o^2}{F^2} - 1\right)^2}}{G} \qquad (2)$$

Where $G$ is the seismometer generator constant. It is Equation 2 which is plotted in the figures as will be discussed later. The frequency dependence of Equations 1 and 2 is seen to be identical. Therefore, the amplitude of ground displacement required to hit the mass stops increases by the same factor by which the constant velocity response decreases below the flat portion of the response characteristics. For example, if the constant velocity response is down by a factor of two at a given frequency, the permissible ground displacement at that frequency may be twice the distance between the stops of the seismometer. Thus, for critical damping, the large-motion capability of the seismometer increases only below its natural resonant frequency. Above this frequency, the earth displacement capability is limited to the stop-to-stop distance of the suspended mass.

It has previously been proposed to extend the low-frequency response of a seismic system by the use of a double integrator amplifier following the seismometer, this amplifier having a frequency response which increases at a rate of 12 db per octave with decreasing frequency, matching the inverse of the velocity response of the seismometer so that the response of the system is thereby flattened to a lower frequency than before. This system will be described below. Such a system suffers from the inherent disadvantage that a double integrator amplifier exhibits instabilities and inaccuracies which have rendered this technique virtually unworkable. In addition, the ground displacement is still limited to the stop-to-stop travel of the suspended mass for frequencies above $F_o$, although of course tolerable ground displacement is increased markedly below $F_o$.

It is therefore the principal object of this invention to provide a seismic system which is capable of measuring very low frequency seismic signals, below about 1 Hz., and is capable of withstanding very large earth motions. Another object is to provide such a seismic system which is free of the inherent stability problems possessed by previous attempts, and which is readily portable and simple in construction.

In accordance with this invention, a seismic system is provided which utilizes a seismometer exhibiting very heavy damping so that the constant velocity frequency response of the seismometer includes a substantial frequency range wherein the roll-off is 6 db per octave rather than 12 db per octave. This seismometer is used in conjunction with an amplifier having a frequency response characteristic matching, i.e., the mirror image of, that of the seismometer over the range of frequencies wherein the low slope is exhibited. Single integration rather than double integration may thus be used in an operational amplifier for this purpose.

The novel features believed characteristic of this invention are set forth in the appended claims. The invention itself, however, as well as further objects and advantages thereof, will best be understood by the following detailed description of a particular embodiment, read in conjunction with the accompanying drawings, wherein:

FIGURES 1a and 1b are graphic representations of the relative amplitude of the output of seismometers or seismic systems plotted as a function of frequency; and FIGURE 2 is a schematic representation of a seismic system including a seismometer coil and amplification means according to this invention.

With reference now to FIGURE 1a, graphic representations of the relative amplitude of the output, for a constant velocity input, for the components of a seismometer system, as well as for the system itself, are illustrated. These factors are plotted as a function of frequency, it being understood that both amplitude and frequency are plotted on log scales as is customary. An example of a system will be described, both with reference to the prior art and to the subject matter of this invention, in terms of a very low frequency system as would be used in the detection and evaluation of the results of a subsurface nuclear blasts. As one reference point, the natural resonant frequency of the seismometer itself is selected as 1 Hz., although of course other frequencies could be selected. The undamped seismometer will therefore have a response characteristic as indicated by the lines 11 and 12 in FIGURE 1a where it is seen that the response peaks, theoretically at infinity, at 1 Hz., this frequency being referred to as $F_o$. Below $F_o$ the response slopes off rapidly as defined by the line 12 to approach an asymptote 13. This line 13 slopes off at a rate of 12 db per octave according to conventional theory.

Ordinarily the seismometer device having a response as indicated by the lines 11–13 would never be used in a system in such form, it being the usual practice to apply damping to smooth out the peak defined by the response to 1 Hz. component. To this end, mechanical, fluid, or electromagnetic damping is applied by various techniques to produce a damping factor of 70% of what is referred to as "critical" damping. The response of the seismometer output with this damping applied would be that indicated by the line 14 in FIGURE 1a where it is seen that the response is down 3 db at $F_o$ or 1 Hz., approaches the asymptote 13 on the low frequency side, thus sloping at 12 db per octave, and approaches the nominal response on the high frequency side.

In order to extend the response to lower frequencies, it has been previously known to utilize a seismometer having 70% critical damping, and then in the amplifier stages following the seismometer output to apply double integration which is understood to be a network which produces an amplitude versus fresuency characteristic that has a slope of 12 db per octave as indicated by the line 15 of FIGURE 1a. Double integration is accomplished by feedback in operational amplifier using resistor-capacitor values selected to produce one break point at $F_o$ and an upward slope of 12 db per octave at lower frequencies. Usually another break point would be introduced at a lower frequency to produce "shelving" or a flat response as indicated by the line 16. This is merely to prevent very low frequency or D.C. instability and is not otherwise material to the system. The line 15 in its central and right-hand portions is a mirror image of the line 14 so that the output of this part of the system, after the operational amplifiers including the double integration components, is flat down to a lower frequency $F_1$ which may be, for example, 0.05 Hz. although of course other values would apply depending upon the components selected for the double integration function. The overall response of the system is defined by a line 17 which follows the nominal output down to near $F_1$, then is down 3 db at $F_1$, then continues parallel to the asymptote 13 at a 12 db per octave slope as indicated by a line 18. The overall response according to the lines 17 and 18 is thus flat over a broader range and covers frequencies down to a very low value; however, certain undesirable features are introduced by a system of this type. The operational amplifiers which have feedback networks to produce double integration unfortunately suffer from instability and inherent inaccuracies which have rendered this previous attempt unsatisfactory. As noted above in reference to Equations 1 and 2, the permissible ground displacement and the frequency response are related. Thus, the damping of the mass in the seismometer itself is noted from the line 14 to be very little, if any, for frequencies above $F_o$ and accordingly the permissible ground displacement which can be measured is still limited to the stop-to-stop travel of the suspended mass in the seismometer for frequencies above the natural frequency of the seismometer. Thus, in the example given with reference to FIGURE 1a, the permissible ground displacement is severely limited for all frequencies above about 2 Hz., and even at $F_o$ it considerably limits the applicability of the system to such uses as instrumentation for subsurface nuclear blasts. It is to correct these problems that the seismic system of this invention has been devised.

The graphic representation of FIGURE 1a may again be examined with attention to a family of curves, similar to the seismometer response curve 14 for critical damping, but showing this response for much higher level of damping. Below and to the right of the curve 14 are lines showing the output of the seismometer as a functional frequency for damping levels of 1.5, 2, 3, 4, 6 and 10. These high levels of damping or high damping factors ordinarily have no utility in a seismometer, but when combined with the amplifier response characteristic as will be later described produce a system having unique capabilities. These improved features result from a quality of the seismometer frequency response which may be observed by examining the curves of FIGURE 1a. It is noted that for increased damping factor the constant velocity response of the seismometer exhibits increasingly broad frequency ranges where the roll-off rate is only 6 db per octave instead of 12 db per octave. This is most apparent in the curve for $h=10$ where on each side of $F_o$ a wide expense of the curve slopes at only 6 db per octave, although the same feature is apparent to a lesser extent for the curves for $h=6$, 4, 3 and even for about 1.5. Examining only the seismometer output characteristics, it will be noted that a system utilizing a seismometer having a damping factor of 10, or one of the lesser numbers, could be compensated in the amplifier by single integration or a slope of 6 db per octave instead of the 12 db per decade feedback arrangement which introduces instabilities. The very high damping factor will be understood to greatly extend the range over which the seismometer device can withstand large mechanical displacements because the seismometer mass will of course tend to be retarded in movement relative to the case. This interrelation is noted above with reference to Equations 1 and 2. A system incorporating these features will now be described.

Referring now to FIGURE 1b, the output versus frequency characteristics of various components of the system, and the system itself, are shown. It will be assumed in this example that the natural resonant frequency $F_0$ of the seismometer is 1 Hz. as before, although this value would be selected by the designer. The undamped response of this seismometer is illustrated for reference in FIGURE 1b by the curves 11 and 12 as above, the low frequency end of this response approaching an asymptote 13 as before. This seismometer is very heavily damped, however, and so actually exhibits an amplitude-frequency response as defined by a line 20 which is the same as the line for $h=10$ in FIGURE 1a. This value of heavy damping is merely selected as an example, it being understood that other values of heavy damping may be chosen. For this particular example, the low frequency break point $F_1$ will be assumed to be 0.05 Hz., whereas the high frequency break point $F_2$ is assumed to be 20 Hz. These actual values may of course be calculated by standard procedures and this example if slightly inprecise, will be understood to be an illustrative example. This response curve 20 will be down 3 db from nominal at $F_2$ and will be down 3 db from the asymptote 13 at $F_1$, but essentially over the range of $F_1$ through $F_2$ the slope of the curve 20 will be 6 db per octave. Accordingly, this curve 20 may be compensated for or matched by an operational amplifier having a response characteristic as indicated by a line 21 in FIGURE 1b, this line having a break point at $F_2$ and a slope of 6 db per octave essentially over the range of $F_1$ through $F_2$. The feedback network for the operational amplifier is selected to define this curve in accordance with conventional practice, the actual values for the resistors and capacitors selected being dependent upon the frequency at $F_2$. As above, another break point is selected at $F_1$ for the amplifier characteristic to produce shelving or a flattened response line 22 for frequencies below $F_1$. This is merely for the purpose of avoiding very low frequency instabilities. The overall response of the system as it appears at the output of the amplifier will be the sum of the two response functions defined by the lines 20 and 21, and so will be a line 23 which is flat essentially down to $F_1$, being down 3 db at $F_1$, then sloping off according to a line 24 parallel to the asymptote 13, this being at the rate of 12 db per octave. The overall response of this system at the amplifier output, as defined by the lines 23-24, will thus be seen to be exactly the same as the response of the system described with reference to FIGURE 1a as defined by the lines 17-18. However, two important distinctions may be noted, the first being that the amplifier response needed to flatten out the system response uses only single integration, i.e., slopes at 6 db per octave rather than 12 db per octave. Secondly, the seismometer itself will be noted to be extremely heavily damped and so can withstand large mechanical movements without hitting the stops for a wide range of frequencies.

A seismic system, including the seismometer and the amplifier or preamplifier, for implementing the features indicated in FIGURE 1b will now be described with reference to FIGURE 2 of the drawings. In FIGURE 2 the seismometer is indicated merely by a coil 25 which represents the pick up coil in a seismometer or geophone of basically conventional design. The particular type of seismometer, as well as the details of the design, are not critical to this invention and so will not be described at length herein. The seismometer may be selected and/or designed in accordance with conventional theory as exemplified in the article by A. T. Dennison entitled, "The Design of Electromagnetic Geophones," appearing in the publication Geophysical Prospecting, at pages 3–28 of the March 1953 issue, volume I, No. 1. In the conventional seismometer a coil is supported by springs in a magnetic field, the windings of the coil along with its coil form and associated springs and conductors together defining the suspended mass, this mass along with the spring suspension being the important factors in determining the natural resonant frequency of the seismometer. The coil is often annular in shape and moves axially in an annular air gap of a permanent magnet which along with its magnetic circuit defines the remaining basic part of the seismometer. The permanent magnet, or in some cases electromagnet, along with its pole pieces and the case usually form the part of the seismometer which is coupled to the earth and moves therewith, the suspended coil remaining almost stationary for most frequencies of interest while the seismometer case and permanent magnet moves with the earth. Mechanical stops are provided to limit the extent of travel of the mass or coil to the mechanical length of the coil in an axially direction as it moves to the air gap. A linear output can thus be produced when the coil is moving to an extent just short of the stops. The large values of damping necessary for this system, such as $h=10$, may be produced in this type of seismometer in various ways. For example, fluid damping may be provided in a dash-pot arrangement connected to the suspended mass. In addition, the amount of damping will be dependent upon the magnitude of current which is permitted to circulate through the coil since the current itself will produce a magnetic field and thus oppose motion. For example, if the coil is shorted at its output, and the coil has a fairly low resistance, heavy damping will result because any tendency for motion of the coil will generate current in the coil, producing an opposing magnetic field limiting the tendency of the coil to move.

In the system illustrated in FIGURE 2, the latter type of damping is assumed to be utilized so that a fairly low resistor 26 connected across the coil 25 introduces the damping factor. It is noted that the resistor 26 has a magnitude lower than the input resistance of the operational amplifier which would ordinarily be of very high input impedance. The resistor 26 is illustrated as variable so that the damping factor might be selected, but it is understood that this may be fixed resistor if the response and other characteristics of the system are known and fixed in advance. Otherwise, the resistor 26 may be a calibrated potentiometer for providing various frequency response characteristics. The output of the seismometer as it appears at a terminal 27, or at the input of the operational amplifier in FIGURE 2 will be defined by the curve 20 in FIGURE 1b. The terminal 27 is connected to the input of an operational amplifier 28, a series resistance 29 being illustrated which may actually be the input resistance of the amplifier itself. It might be noted that the seismometer output at the terminal 27 would resemble the curves 11, 12 and 13 if the resistor 26 was infinite and damping otherwise zero. The output of the operational amplifier 28 is applied to an output 29, this output being applied to the input of a further amplifier, which would usually incorporate gain control features, and ultimately to a recorder of conventional form. This remaining portion of the system is not material to the invention and thus will not be treated in detail herein.

A significant feature of the invention is the connection of the output 29 back through a feedback network including a resistor 30 and a capacitor 31. These components are selected to have values in accordance with conventional theory to produce a break point at $F_2$, this network producing single integration or a response which increases at 6 db per octave below $F_2$. A resistor 32 connected across the capacitor 31 is selected in view of the value of the capacitor 31 and the value of $F_1$ to produce the shelving characteristic as indicated by the line 22. Thus the feedback network including the component 30–32 produces the amplifier response curve 21 and 22 as seen in FIGURE 1b. The overall response as it appears at the terminal 29 will thus be the sum of the response of the amplifier and the response of the seismometer and so will resemble the curve 23 and 24 in FIGURE 1b.

In a seismic system as referred to in the example above, with $F_0=1$ Hz. and $h=10$, the constant velocity response of this system is flat down to approximately 0.1 Hz. before it begins to roll off. The suspension stiffness of a seismometer having a natural resonant frequency of 1 Hz. is adequate to prevent tilt sensitivity, and it may be noted that the mass need only be centered by visual alignment. This highly damped seismometer is capable of withstanding large motions without the suspended mass hitting the stops for frequencies far above, as well as below, the natural seismometer frequency. As an example, using Equation 1 and $h=10$, the ground displacement, X, is within 1% of the relative displacement between mass and the case Y, only in F greater than 140 $F_0$, and so for $F_0=1$ Hz. this means that $F=140$ Hz., this value being well above the normal frequencies of interest in seismology. The large damping also produces an improvement, compared to previous attempts, in the large displacement capability of the system at the low frequency end. As an example, if 0.1 Hz. is the lowest frequency of interest, with $F_0=1$ Hz. and $h=10$, the ground displacement, X, that can be tolerated is 224Y. If the stop-to-stop distance is $Y=\frac{3}{8}$ inch, then 224Y or 7 feet peak-to-peak tolerable ground displacement is exhibited. This should be compared to the prior art system mentioned above wherein standard damping, $h=0.707$, and double integration is used, the maximum tolerable ground displacement being only 100Y at $F=0.1$ Hz. For $Y=\frac{3}{8}$ inch, 3¾ feet ground displacement is tolerable at the low frequency end, but for higher frequencies the tolerable ground displacement is little more than Y. Thus, the system according to this invention provides a tolerable displacement which is significantly improved at the low frequency, while being vastly improved at the high frequency end.

The seismometer in accordance with this invention, as described above, thus provides not only improvement in the low-frequency response characteristics, but also increases the large motion capability of the seismometer and removes the requirement for unstable double integration and provides a highly stable system. In addition, of course, the system is much simpler and is made more portable due to the fact that a large suspended mass is not necessary. These improved characteristics are at the expense only of some velocity sensitivity which is lost in the system due to the fact that the amplifier gain must roll off at high frequencies, a factor of little consequence in the primary field of use of such a system.

While the invention has been described with reference to a particular embodiment, this description is not meant to be construed in a limiting sense. Various modifications of the disclosed embodiment, as well as other embodiments of the invention, will be apparent to persons skilled in the art upon reference to this application. It is therefore contemplated that the appended claims will cover any such modifications or embodiments as fall within the true scope of the invention.

What is claimed is:

1. In a low frequency seismic system, a seismometer damped at much greater than critical damping and amplifying means connected to receive the electrical output of the seismometer for providing an output signal which is the first integral of the output of the seismometer, the amplifying means having a transfer function which over a substantial range of frequencies is the inverse of the frequency response characteristic of the damped seismometer.

2. In a vibration responsive system, a vibration transducer responsive to a constant velocity input for producing an electrical output of an amplitude which varies as a function frequency and exhibits a slope of much less than 12 db per octave over a substantial range of frequencies above and below a resonant frequency of said transducer, and amplifying means receiving said electrical output and effective to produce an output having a frequency response characteristic which approximates the inverse of said frequency response of said vibration transducer over said substantial range of frequencies.

3. Apparatus according to claim 2 wherein the vibration transducer is a seismometer having a damping factor of at least six whereby said range is greater than about one decade.

4. Apparatus according to claim 2 wherein the vibration transducer is a seismometer damped at much greater than critical damping.

5. Apparatus according to claim 2 wherein said slope is a roll off for decreasing frequencies at about 6 db per octave.

6. A method of producing an electrical representation of mechanical vibrations comprising the steps of damping a vibration transducer to the extent that it produces electrical signals of an amplitude which varies as the function of frequency and exhibits a slope of much less than 12 db over a substantial range of frequencies above and below a resonant frequency of the transducer responsive to said mechanical vibrations, positioning said transducer to receive said mechanical vibrations, and integrating said signals produced when mechanical vibrations are received over said frequency range to produce said electrical representation.

7. A method according to claim 6 wherein said integration is a single integration.

8. A method according to claim 7 wherein the frequency response of said integration exhibits a slope over said range of frequencies which is the inverse of that exhibited by the transducer after damping.

9. Method according to claim 8 wherein the damping of the vibration transducer is sufficient that the frequency sensitivity of the transducer slopes at a rate which is a roll-off for decreasing frequencies at about 6 db per octave.

References Cited

UNITED STATES PATENTS

| | | | |
|---|---|---|---|
| 2,959,347 | 11/1960 | Kearns. | |
| 3,073,524 | 1/1963 | Ford | 73—71.4 X |
| 3,148,537 | 9/1964 | Berwin et al. | 73—71.4 |

RODNEY D. BENNETT, *Primary Examiner.*

C. E. WANDS, *Assistant Examiner.*